(12) United States Patent
Griffin et al.

(10) Patent No.: US 10,012,187 B1
(45) Date of Patent: Jul. 3, 2018

(54) CHARGE MOTION CONTROL VALVE

(71) Applicant: Ford Global Technologies, LLC, Dearborn, MI (US)

(72) Inventors: Murray Clyde Griffin, Allen Park, MI (US); John Carl Lohr, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/399,656

(22) Filed: Jan. 5, 2017

(51) Int. Cl.
*F02M 35/10* (2006.01)
*F02F 1/42* (2006.01)

(52) U.S. Cl.
CPC ....... *F02M 35/10255* (2013.01); *F02F 1/425* (2013.01); *F02M 35/10072* (2013.01)

(58) Field of Classification Search
CPC ........ F02M 35/10255; F02M 35/10072; F02F 1/425
See application file for complete search history.

(56) References Cited

U.S. PATENT DOCUMENTS

| | | | | |
|---|---|---|---|---|
| 4,945,865 A * | 8/1990 | Lee | ............... | F02B 27/02 123/184.35 |
| 5,492,093 A * | 2/1996 | Rygiel | ............... | F02M 29/06 123/306 |
| 5,535,717 A * | 7/1996 | Rygiel | ............... | F02D 9/02 123/306 |
| 5,595,062 A * | 1/1997 | Chabry | ............... | F02B 27/00 123/184.53 |
| 6,321,720 B1 * | 11/2001 | Kashima | ............... | F02B 61/045 123/184.31 |
| 8,056,534 B2 | 11/2011 | Magnan et al. | | |
| 2002/0083911 A1 * | 7/2002 | Ward | ............... | F02B 75/221 123/184.55 |
| 2005/0016602 A1 * | 1/2005 | Schub | ............... | F02D 9/1015 137/601.09 |
| 2008/0271697 A1 | 11/2008 | Vichinsky | | |
| 2014/0096734 A1 * | 4/2014 | Dudek | ............... | F02M 35/10255 123/184.53 |
| 2014/0165961 A1 * | 6/2014 | Patel | ............... | F02M 35/10255 123/337 |
| 2014/0352643 A1 * | 12/2014 | Clarke | ............... | F02M 35/10209 123/184.21 |

\* cited by examiner

*Primary Examiner* — Joseph Dallo
(74) *Attorney, Agent, or Firm* — Julia Voutyras; McCoy Russell LLP

(57) ABSTRACT

Methods and systems are provided for a charge motion control valve mounted within a flow passage in an intake manifold coupled to an engine. In one example design, a control valve comprises a valve plate with a pivot axis mounted in a body coupled to a manifold runner, the plate having a rear portion overhanging the pivot; and a first sealing surface in the manifold runner to receive a surface of the rear portion of the valve plate when fully opened; and a second sealing surface in the body to receive an opposite surface of the rear portion of the valve plate when fully closed. In this way, the valve plate may be adjusted to block a portion of a flow passage within the body to minimize air leakages at a periphery of the passage while redirecting air flow to create swirl motion downstream of the valve plate.

20 Claims, 10 Drawing Sheets

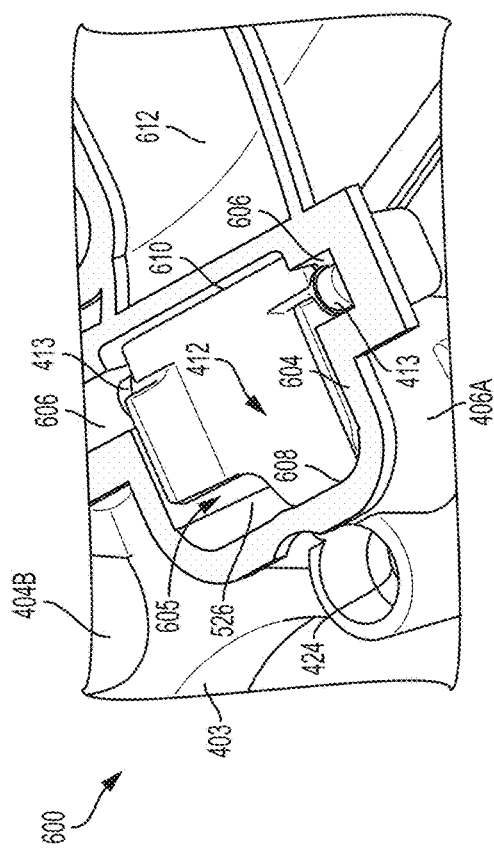

CHARGE MOTION CONTROL VALVE

FIELD

This disclosure relates to a charge motion control valve mounted within a flow passage in an intake manifold and an assembly coupled to an engine.

BACKGROUND/SUMMARY

Flow motion of air inducted into an intake manifold may be modified to promote mixing of air and injected fuel in a combustion chamber of a vehicle engine to improve combustion efficiency. Air flow in the intake manifold may be modified by redirecting the flow in a particular direction to increase air flow velocity prior to entry into the combustion chamber. The increased air flow velocity may homogenize the air-fuel mixture in the combustion chamber, and may speed up propagation of an ignition front through the combustion chamber. The homogenous air-fuel mixture may combust with improved efficiency to reduce fuel emissions. The increased propagation speed of the ignition front may allow longer interaction of air with injected fuel, and may promote rapid combustion of the air-fuel mixture to produce thermal energy required for piston motion.

A charge motion control valve may be used in an engine to induce swirl motion or turbulent flow by blocking a portion of an inlet of a flow passage, and redirecting air flow in a particular direction within the flow passage. The air may be further flowed to the combustion chamber where air mixes with injected fuel. By closing the portion of the passage inlet to redirect air flow, flow velocities of air inducted into the combustion chamber may increase to promote adequate mixing of air and injected fuel prior to ignition of the air-fuel mixture.

An example charge motion control valve is disclosed by Magnan in U.S. Pat. No. 8,056,534. Therein, the charge motion control valve includes a valve plate mounted within an inlet passage of an engine runner via a control shaft driven by an electric or vacuum motor. Further, a sealing member is secured to an outer face of the engine runner to reduce air leakages between the engine runner and engine.

However, the inventors have recognized potential issues with such a charge motion control valve design. For example, the valve plate may be mounted within the inlet passage in such a manner that the plate may not completely block side openings at the periphery of the passage inlet, which may cause air leakage and reduce combustion efficiency of ignited fuel in the combustion chamber. Alternatively, use of seals may add unwanted friction and further may create issues upon degradation of the seal over time.

The inventors herein have developed a charge motion control valve to address some of the issues noted above. In one example, a charge motion control valve comprises a valve plate with a pivot axis mounted in a body coupled to a manifold runner, the plate having a rear portion overhanging the pivot; and a first sealing surface in the manifold runner to receive a surface of the rear portion of the valve plate when fully opened; and a second sealing surface in the body to receive an opposite surface of the rear portion of the valve plate when fully closed. In this example, the valve plate is fully open when the plate is adjusted to a fully unblocked position within a flow passage formed in the manifold runner and body. Further, the valve plate is fully closed when the plate is adjusted to a fully blocked position within the flow passage. Alternatively, a shell membrane may be placed in face-sharing contact with a portion of the valve plate at the passage inlet.

In this way, the rear overhang on the valve plate may reduce air leakages through a back end of the valve plate, and the shell membrane may minimize air leakages at the periphery of the passage inlet. By reducing air leakages around the periphery of the passage inlet, flow motion of air inducted into the flow passage may be redirected to a particular segment of an intake valve in the combustion chamber to maximize swirl which may promote adequate mixing of air and injected fuel to improve combustion efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A shows an isometric view of the charge motion control valve adjusted to the fully blocked position within the flow passage.

FIG. 6B shows a plan view of the charge motion control valve adjusted to the fully blocked position within the flow passage.

FIGS. 2-7C are shown to scale, although other relative dimensions may be used, if desired.

DETAILED DESCRIPTION

Figure 1:
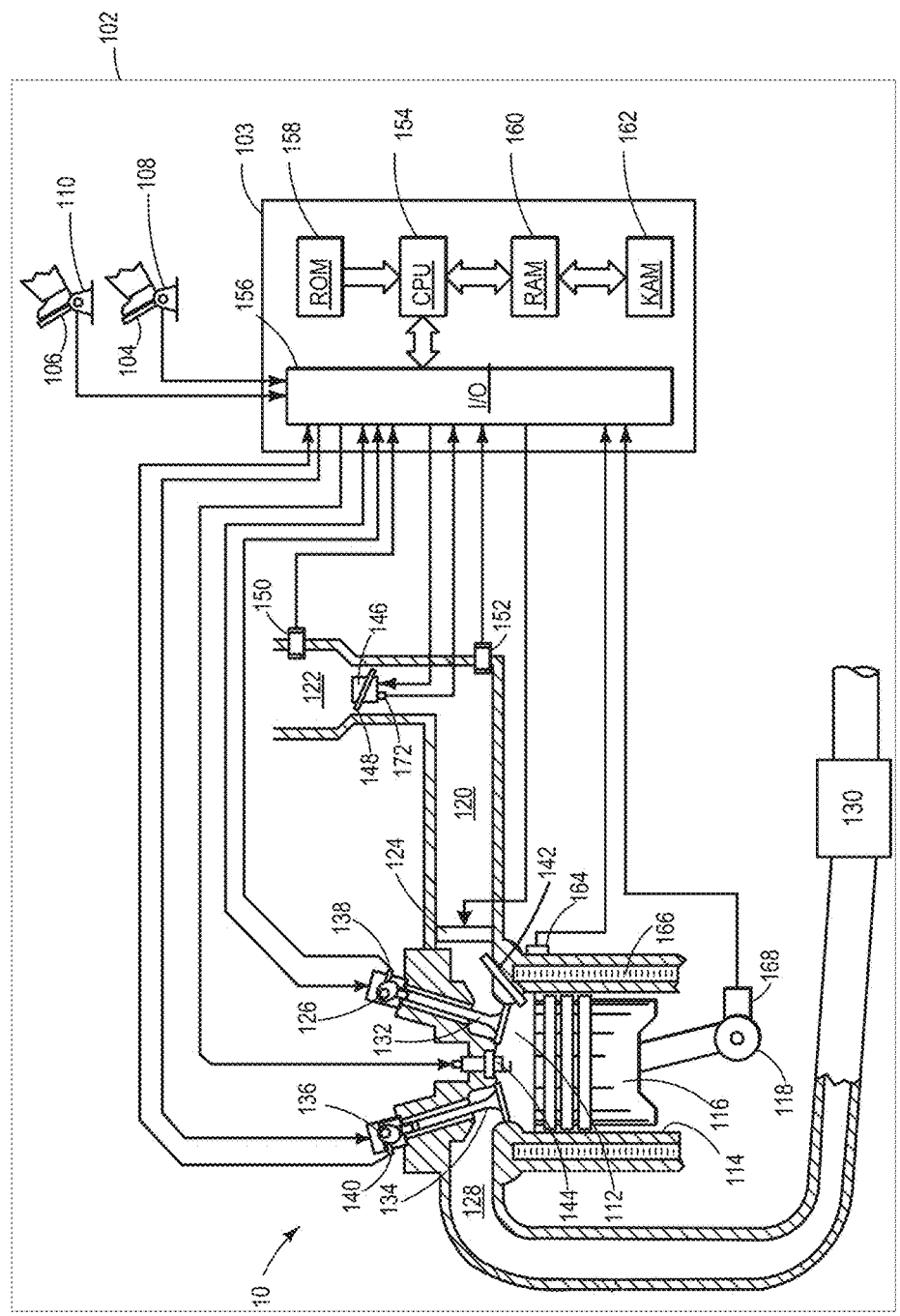
FIG. 1 shows a schematic depiction of a combustion chamber of an engine system.
Figure 2:
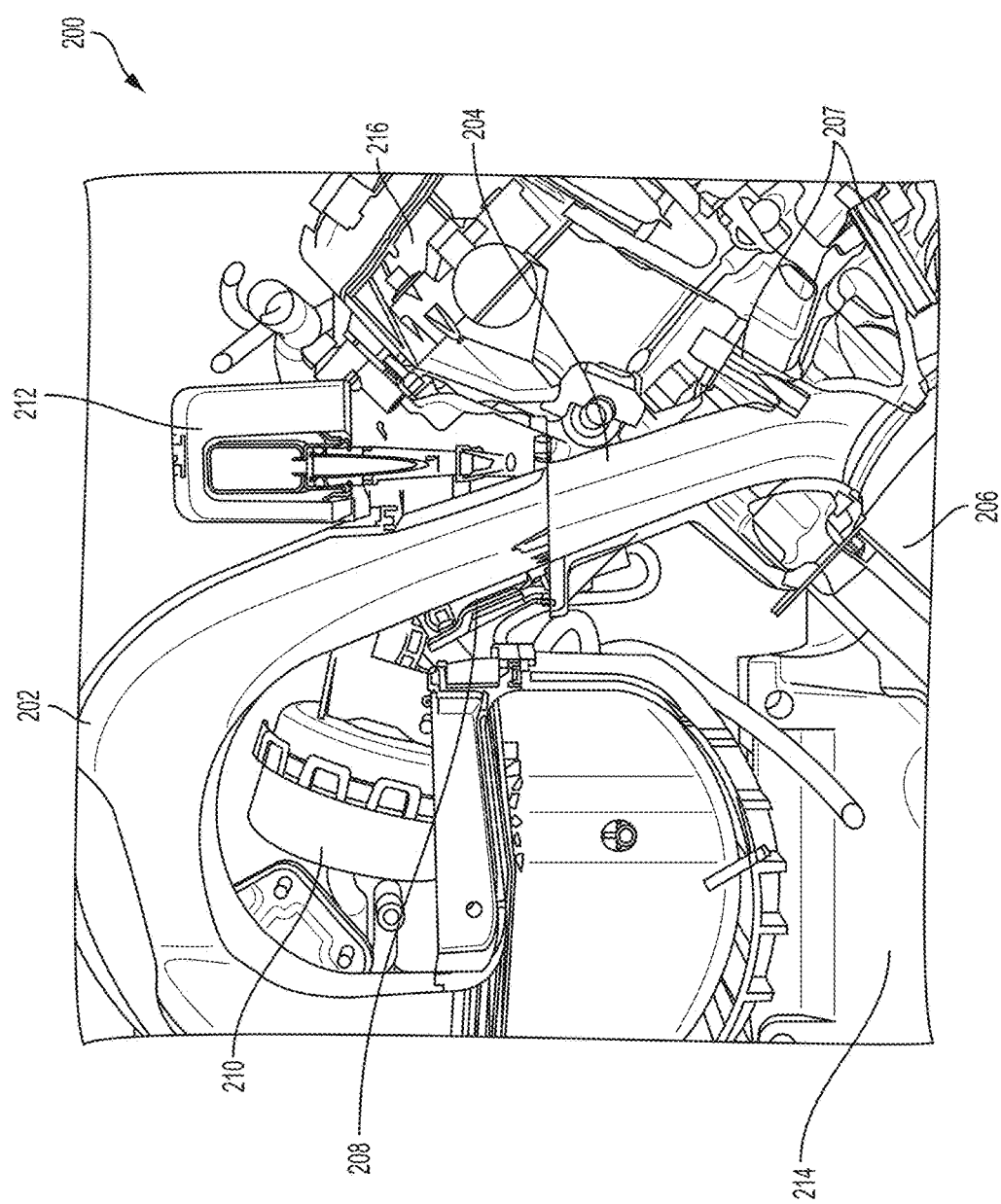
FIG. 2 shows a schematic depiction of an intake manifold configured with a charge motion control valve coupled to a valve actuator.
Figure 3:
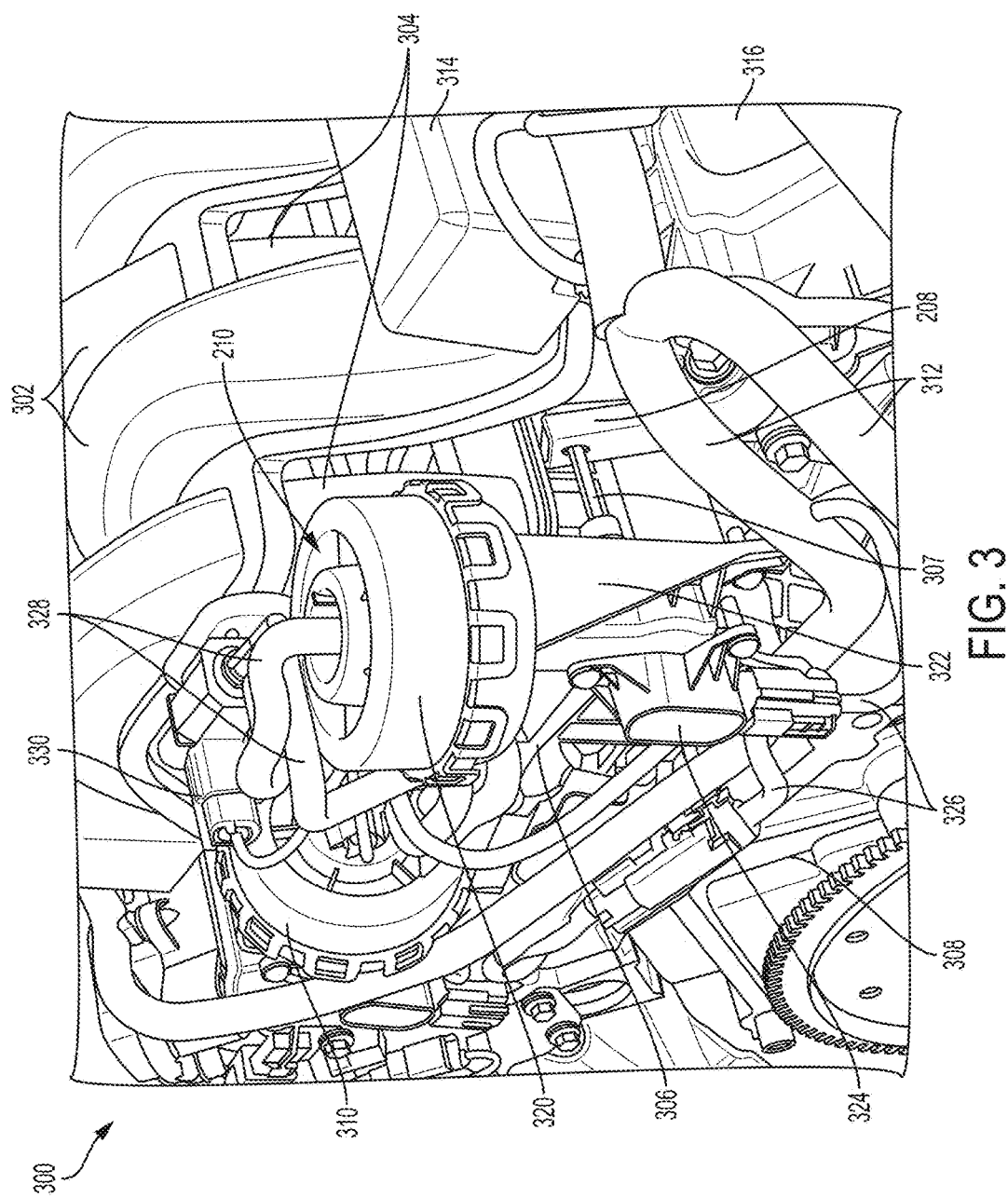
FIG. 3 shows a schematic depiction of an engine system configured with the valve actuator to adjust position of the charge motion control valve mounted inside the intake manifold.

The following description relates to systems and methods for a charge motion control valve coupled to an engine. The charge motion control valve may be mounted within a flow passage or an intake manifold, as shown in FIG. 1. The charge motion control valve may include a valve plate with a curved portion, and a spindle that may be coupled to a control shaft which is controlled by a valve actuator driven by an electric or vacuum motor as shown in FIGS. 2-3. The valve plate may be mounted within an inlet of the flow passage in such a manner that a portion of the passage inlet is blocked while a primary and a secondary aperture in the passage inlet remain open. In this way, the valve plate may minimize air leakages around the periphery of the flow passage while allowing air flow into a combustion chamber via the primary and secondary opening in the passage inlet as shown in FIGS. 4A-5A. When the valve plate is adjusted to unblock the flow passage, unrestricted air flow may be directed towards the combustion chamber, as shown in FIG. 5A. The control valve may be adjusted to partially block the flow passage, thereby redirecting air flow into a particular segment in an intake valve within a combustion chamber to maximize swirl in the combustion chamber. As shown in FIGS. 5B-6B, the control valve may be adjusted to block the flow passage, thereby restricting air flow into the flow passage. In this case, air velocity in the flow passage may increase, causing swirl motion or turbulent flow downstream of the charge motion control valve. The swirl motion may enhance mixing of air and injected fuel in the combustion chamber to create a homogenous air-fuel mixture which combusts with improved efficiency while minimizing fuel emissions.

Figure 7A:
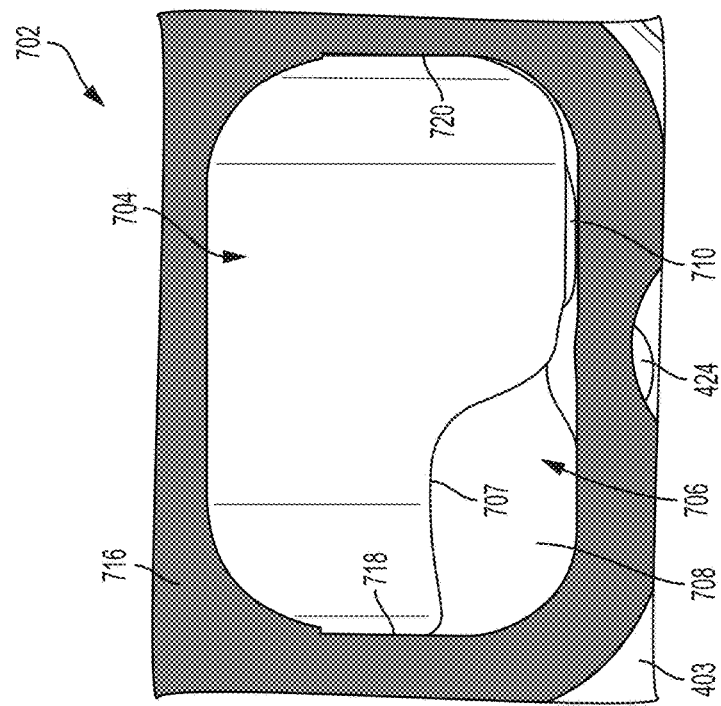
FIG. 7A shows a plan view of an alternative embodiment of a charge motion control valve adjusted to the fully blocked position within the flow passage.
Figure 7B:
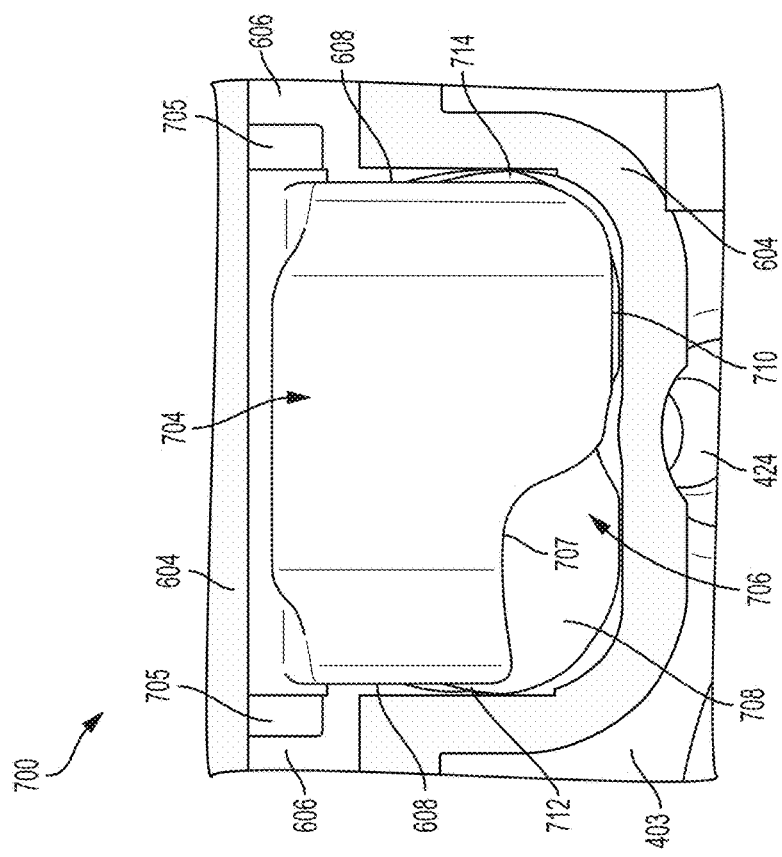
FIG. 7B shows a plan view of the charge motion control valve with a shell membrane placed in face contact with a portion of the control valve and flow passage.
Figure 7C:
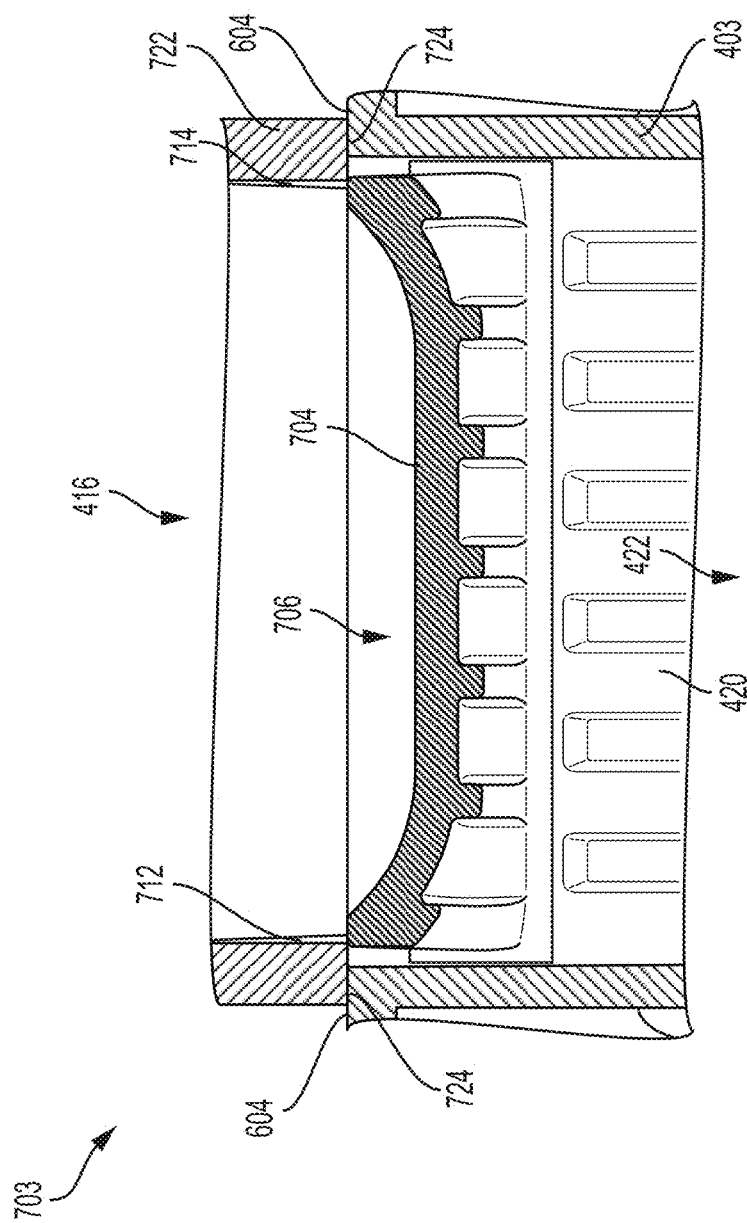
FIG. 7C shows a cross sectional view of the charge motion control valve with an interface surface of the manifold that is in face-sharing contact with an assembly at the passage inwardly offset around a perimeter.

An alternative embodiment of the charge motion control valve mounted within the passage inlet of the flow passage is shown in FIG. 7A. In this case, the valve plate of the control valve may partially block the passage inlet, however air may leak through side openings in the periphery of the passage inlet. A shell membrane may be positioned adjacent to a flange of the passage inlet, to block the side openings around the periphery of the passage inlet, as shown in FIG. 7B. The intake manifold may be placed in face-sharing contact with an assembly at inwardly offset position at the periphery of the passage inlet, as shown in FIG. 7C. In this case, the shell membrane may be sandwiched in between the manifold and the assembly. In this way, the shell membrane may be used in conjunction with the valve plate to reduce air leakage through the side openings in the flow passage. By reducing air leakage in the periphery of the passage inlet, air inducted into the flow passage may be adequately flowed to the combustion chamber where is the air mixes with injected fuel to produce an air-fuel mixture that may combust efficiently to reduce fuel emissions.

Referring to FIG. 1, a schematic diagram shows one cylinder of a multi-cylinder engine 10 in an engine system 100, which may be included in a propulsion system, such as in vehicle 102. The engine 10 may be controlled at least partially by a control system including a controller 103 and by inputs from a vehicle operator via a first input device 104 and a second input device 106. In this example, the first input device 104 includes an accelerator pedal (herein also referred to as a go pedal) and a first pedal position sensor 108 for generating a proportional accelerator pedal position signal. The second input device 106 includes a brake pedal and a second pedal position sensor 110 for generating a proportional brake pedal position signal.

A combustion chamber 112 of the engine 10 may include a cylinder formed by cylinder walls 114 with a piston 116 positioned therein. The piston 116 may be coupled to a crankshaft 118 so that reciprocating motion of the piston is translated into rotational motion of the crankshaft. The crankshaft 118 may be coupled to at least one drive wheel of a vehicle via an intermediate transmission system. Further, a starter motor may be coupled to the crankshaft 118 via a flywheel to enable a starting operation of the engine 10.

The combustion chamber 112 may receive intake air from an intake manifold 120 via an intake passage 122. A valve plate 124 of a charge motion control valve may be mounted within the intake manifold 120 upstream of an intake port of the combustion chamber 112. The valve plate 124 may be adjusted to unblock or partially block a port inlet to the combustion chamber 112 by a valve actuator (not shown) coupled to the valve plate and connected to an engine controller 103. When adjusted to partially block the port inlet, air inducted into the combustion chamber 112 may be redirected in a particular segment of the intake valve within the combustion chamber to create swirl flow or turbulent flow in the combustion chamber 112. By controlling air flow motion, swirl flow created in the combustion chamber 112 may enhance mixing of air and injected fuel to create a homogenous air-fuel mixture which may combust with improved efficiency. The combustion chamber 112 may exhaust combustion gases via an exhaust passage 128 to an exhaust treatment device 130. The intake manifold 120 and the exhaust passage 128 can selectively communicate with the combustion chamber 112 via respective intake valve 132 and exhaust valve 134. In some examples, the combustion chamber 112 may include two or more intake valves and/or two or more exhaust valves.

In this example, the intake valve 132 and exhaust valve 134 may be controlled by cam actuation via respective cam actuation systems 126 and 136. The cam actuation systems 126 and 136 may each include one or more cams and may utilize one or more of cam profile switching (CPS), variable cam timing (VCT), variable valve timing (VVT), and/or variable valve lift (VVL) systems that may be operated by the controller 103 to vary valve operation. The position of the intake valve 132 and exhaust valve 134 may be determined by position sensors 138 and 140, respectively. In alternative examples, the intake valve 132 and/or exhaust valve 134 may be controlled by electric valve actuation. For example, the combustion chamber 112 may alternatively include an intake valve controlled via electric valve actuation and an exhaust valve controlled via cam actuation including CPS and/or VCT systems.

A fuel injector 142 is shown coupled directly to combustion chamber 112 for injecting fuel directly therein in proportion to the pulse width of a signal received from the controller 103. In this manner, the fuel injector 142 provides what is known as direct injection of fuel into the combustion chamber 112. The fuel injector may be mounted in the side of the combustion chamber or in the top of the combustion chamber, for example. Fuel may be delivered to the fuel injector 142 by a fuel system (not shown) including a fuel tank, a fuel pump, and a fuel rail. In some examples, the combustion chamber 112 may alternatively or additionally include a fuel injector arranged in the intake manifold 120 in a configuration that provides what is known as port injection of fuel into the intake port upstream of the combustion chamber 112.

Spark is provided to combustion chamber 112 via spark plug 144. The ignition system may further comprise an ignition coil (not shown) for increasing voltage supplied to spark plug 144. In other examples, such as a diesel, spark plug 144 may be omitted. The intake passage 122 may include a throttle 146 having a throttle plate 148. In this particular example, the position of throttle plate 148 may be varied by the controller 103 via a signal provided to an electric motor or actuator included with the throttle 146, a configuration that is commonly referred to as electronic throttle control (ETC). In this manner, the throttle 146 may be operated to vary the intake air provided to the combustion chamber 112 among other engine cylinders. The position of the throttle plate 148 may be provided to the controller 103 by a throttle position signal. The intake passage 122 may include a mass air flow sensor 150 and a manifold air pressure sensor 152 for sensing an amount of air entering engine 10.

The controller 103 is shown in FIG. 1 as a microcomputer, including a microprocessor unit 154, input/output ports 156, an electronic storage medium for executable programs and calibration values shown as read only memory chip 158 (e.g., non-transitory memory) in this particular example, random access memory 160, keep alive memory 162, and a data bus. The controller 103 may receive various signals from sensors coupled to the engine 10, in addition to those signals previously discussed, including measurement of inducted mass air flow (MAF) from the mass air flow sensor 150; engine coolant temperature (ECT) from a temperature sensor 164 coupled to a cooling sleeve 166; an engine position signal from a Hall effect sensor 168 (or other type) sensing a position of crankshaft 118; throttle position from a throttle position sensor 172; manifold absolute pressure (MAP) signal from the sensor 152; accelerator signal from the first pedal sensor 108; brake signal from the second pedal sensor 110. An engine speed signal may be generated by the controller 103 from sensor 168 mounted to the crankshaft. Manifold pressure signal also provides an indication of vacuum, or pressure, in the intake manifold 120. Note that various combinations of the above sensors may be used, such as a MAF sensor without a MAP sensor, or vice versa. During engine operation, engine torque may be inferred from the output of MAP sensor 152 and engine speed. Further, the MAP sensor, along with the detected engine speed, may be a basis for estimating charge (including air) inducted into the cylinder. In one example, the sensor 168 mounted to the crankshaft, which is also used as an engine speed sensor, may produce a predetermined number of equally spaced pulses every revolution of the crankshaft.

The storage medium read-only memory 158 can be programmed with computer readable data representing non-transitory instructions executable by the processor 154 for performing the methods described below as well as other variants that are anticipated but not specifically listed.

During operation, each cylinder within engine 10 typically undergoes a four stroke cycle: the cycle includes the intake stroke, compression stroke, expansion stroke, and exhaust stroke. During the intake stroke, generally, the exhaust valve 134 closes and intake valve 132 opens. Air is introduced into combustion chamber 112 via intake manifold 120, and piston 116 moves to the bottom of the cylinder so as to increase the volume within combustion chamber 112. The position at which piston 116 is near the bottom of the cylinder and at the end of its stroke (e.g., when combustion chamber 112 is at its largest volume) is typically referred to by those of skill in the art as bottom dead center (BDC).

During the compression stroke, intake valve 132 and exhaust valve 134 are closed. Piston 116 moves toward the cylinder head so as to compress the air within combustion chamber 112. The point at which piston 116 is at the end of its stroke and closest to the cylinder head (e.g., when combustion chamber 112 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 144, resulting in combustion.

During the expansion stroke, the expanding gases push piston 116 back to BDC. Crankshaft 118 converts piston movement into a rotational torque of the rotary shaft. Finally, during the exhaust stroke, the exhaust valve 134 opens to release the combusted air-fuel mixture to exhaust passage 128 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures graphically represent code to be programmed into the computer readable storage medium in controller 12 to be carried out by the controller in combination with the engine hardware, as illustrated in FIG. 1.

Based on input from one or more of the above-mentioned sensors, controller 103 may adjust one or more actuators, such as fuel injector 142, spark plug 144, throttle 146, intake/exhaust valves and cams, etc. The controller 103 may receive input data from the various sensors, process the input data, and trigger the actuators in response to the processed input data based on instruction or code programmed therein corresponding to one or more routines. For example, in response to receiving a signal from the controller 103, the valve actuator may adjust position of the valve plate 124 of the charge motion control valve to create swirl motion in the combustion chamber 112.

Referring to FIG. 2, a schematic diagram showing an intake manifold 202 coupled to an flow passage 204 leading to a combustion chamber 206 is shown. A valve plate 208 of a charge motion control valve, similar to valve plate 124 of engine system 10 shown in FIG. 1, may be mounted in an interior region of the intake manifold 202. The valve plate 208 may be adjusted to fully unblock or partially block the flow passage 204 by a valve actuator 210, thereby controlling air flow motion downstream of the control valve and inside the combustion chamber 206. The combustion chamber 206 may be mounted to a cylinder head 214 coupled to an engine body 216. The valve actuator 210 may be coupled to the valve plate 208 via a shaft rod (not shown) which may be adjusted to move the valve plate to a fully unblocked position or a blocked position within the flow passage 204 during engine operation. The valve actuator 210 may be driven by an electric or vacuum motor 212, and controlled by an engine controller (not shown). As an example, the engine controller may send instructions to the valve actuator 210 to adjust the position of the valve plate within the flow passage. In one example, the engine controller may instruct the valve actuator 210 to adjust the valve plate to the fully blocked position within the flow passage 204 based on engine operating conditions, such as engine speed and load.

The valve plate 208 within the intake manifold 202 may be adjusted to partially block the flow passage 204 and redirect air inside the intake manifold into the flow passage 204, where the air is further flowed to a particular segment of intake valves in the combustion chamber 206. As an example, the valve plate 208 may be configured with a plate having a side opening that allows air flow entering the flow passage 204 to increase in velocity as the inducted air advances towards the combustion chamber 206. Details of the charge motion control valve are disclosed further below with reference to FIGS. 4A-4B.

Fuel may be injected into the combustion chamber 206 via fuel injectors 207. The injected fuel may mix with air to form air-fuel mixture which may be ignited inside the combustion chamber 206. By adjusting the position of the valve plate 208, flow motion of air entering the combustion chamber 206 may be modified, creating swirl flow or turbulent flow which may enhance mixing of air and injected fuel in the combustion chamber to homogenize the air-fuel mixture which may combust with improved efficiency. Details of the valve actuator for adjusting position of the valve plate within the intake manifold are disclosed further below with reference to FIG. 3.

Turning to FIG. 3, a schematic diagram of an engine system 300 having a charge motion control valve is shown. The charge control valve may include a valve actuator 210 for adjusting position of a valve plate 208 within a lower intake passage 304. The valve actuator 210 may be coupled to a controller (not shown), and driven by an electric motor 310. An upper intake passage 302 may be coupled at an upstream end to an intake manifold, such as intake manifold 120 shown in FIG. 1. A downstream end of the upper intake passage 302 may be coupled to the lower intake passage 304 which may be secured to an intake port (not shown) positioned inside an assembly 306 which may be an integral component of a cylinder head for example. In an alternative example, assembly 306 may be a separate assembly sandwiched between the intake manifold and an engine body 308. Air entering the intake manifold may flow through the upper and lower intake passages before entering a combustion chamber (e.g., combustion chamber 206 shown in FIG. 2) coupled to assembly 306. Further, the engine system 300 may include an engine wiring harness 312, a foam cover 314 and a cam cover 316. The foam cover 314 may be mounted to a fuel rail to reduce noise, vibration and harshness caused by injector tick. The cam cover 316 may be mounted to a cylinder head housing (not shown) containing a cam shaft assembly.

As shown in FIG. 3, the valve actuator 210 may include an annular portion 320 and a vertical arm 322 secured to the engine body. A control shaft 307 may be coupled to the vertical arm 322 of the valve actuator 210 at a first end, and coupled to the valve plate 208 at a second end of the shaft. A first connector module 324 connected secondary cables 326, may be coupled to the vertical arm 322 to transmit instructors from the engine controller to the valve actuator 210. As an example, based on engine speed and load, the engine controller may send instructions to the valve actuator 210 (via secondary cables 326) to adjust the valve plate 208 to either an open or closed valve position. The valve plate 208 may be actuated by the control shaft 307 coupled to the valve actuator 210. A plurality of primary cables 328 may connect the valve actuator 210 to the electric motor 310. As an example, the primary cables 328 may transmit electrical power from the electrical motor 310 to operate the valve actuator 210 during engine operation. A second connector module 330 may be connected to the electric motor 310 and the engine controller, thereby allowing output from the electric motor 310 to be adequately controlled during operation of the valve actuator 210.

The control shaft 307 coupled to the valve actuator 210, may be actuated to adjust the valve plate 208 to the open valve position. When adjusted to the open valve position, air flows from the lower intake passage 304 into the intake port of the combustion chamber, without any obstructions. Alternatively, the valve plate 208 may be adjusted to the closed valve position to restrict air flow from the lower intake passage 304 into the intake port of the combustion chamber while minimizing air leakages at a periphery of the lower intake passage. In this case, the restricted flow of air through the intake passage may increase air flow velocity, causing turbulent flow or swirl motion which enhances mixing of air and injected fuel in the combustion chamber. The increased mixing of air and injected fuel may create a homogenous air-fuel mixture which may combust with improved efficiency. In this way, the valve plate 208 may be controlled via the control shaft 307 to modify air flow motion in the intake passage to enhance homogeneity of the air-fuel mixture which may combust efficiently to reduce fuel emissions.

Figure 4A:
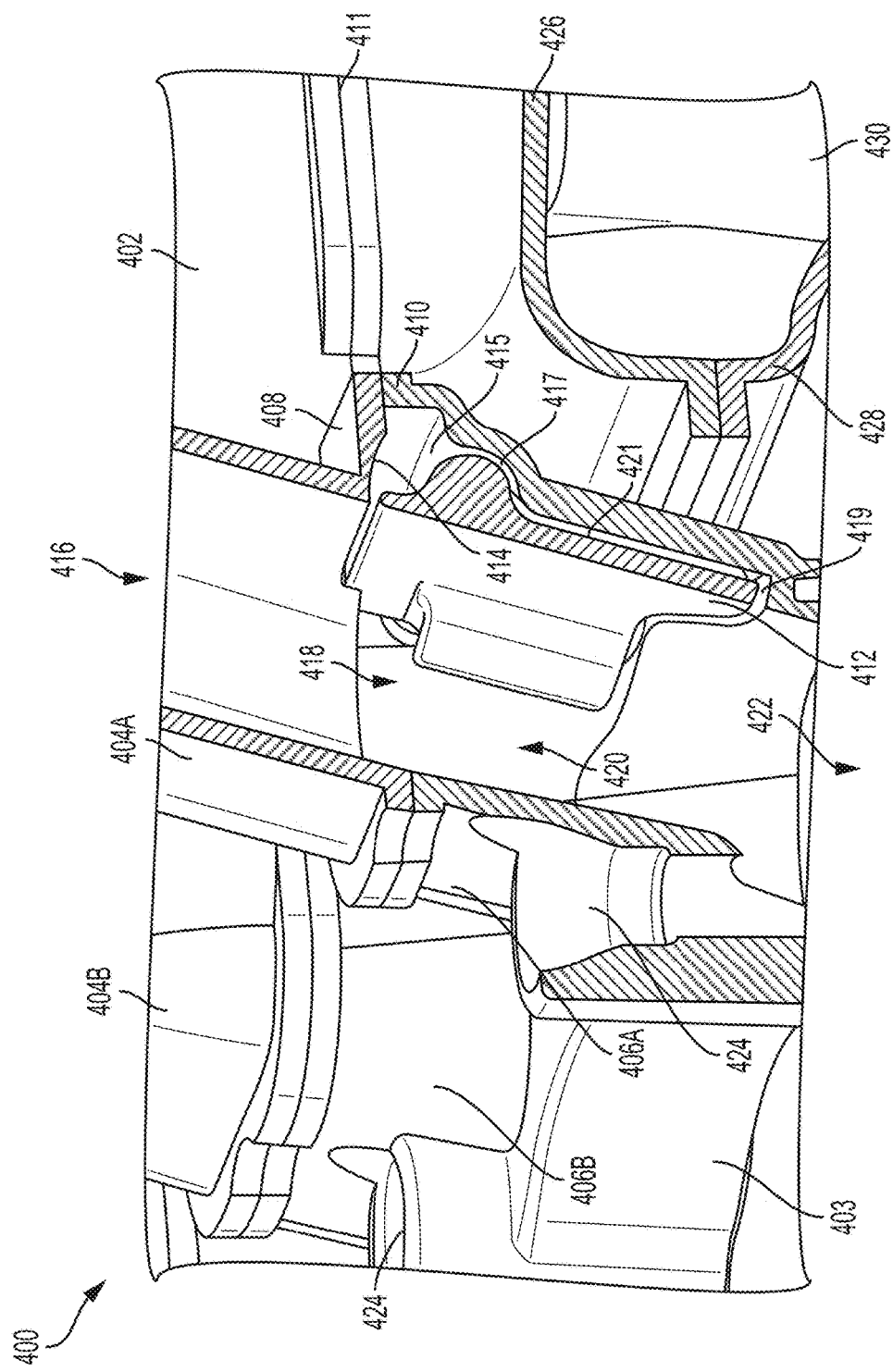
FIG. 4A shows an isometric view of a charge motion control valve adjusted to fully unblock a flow passage.
Figure 4B:
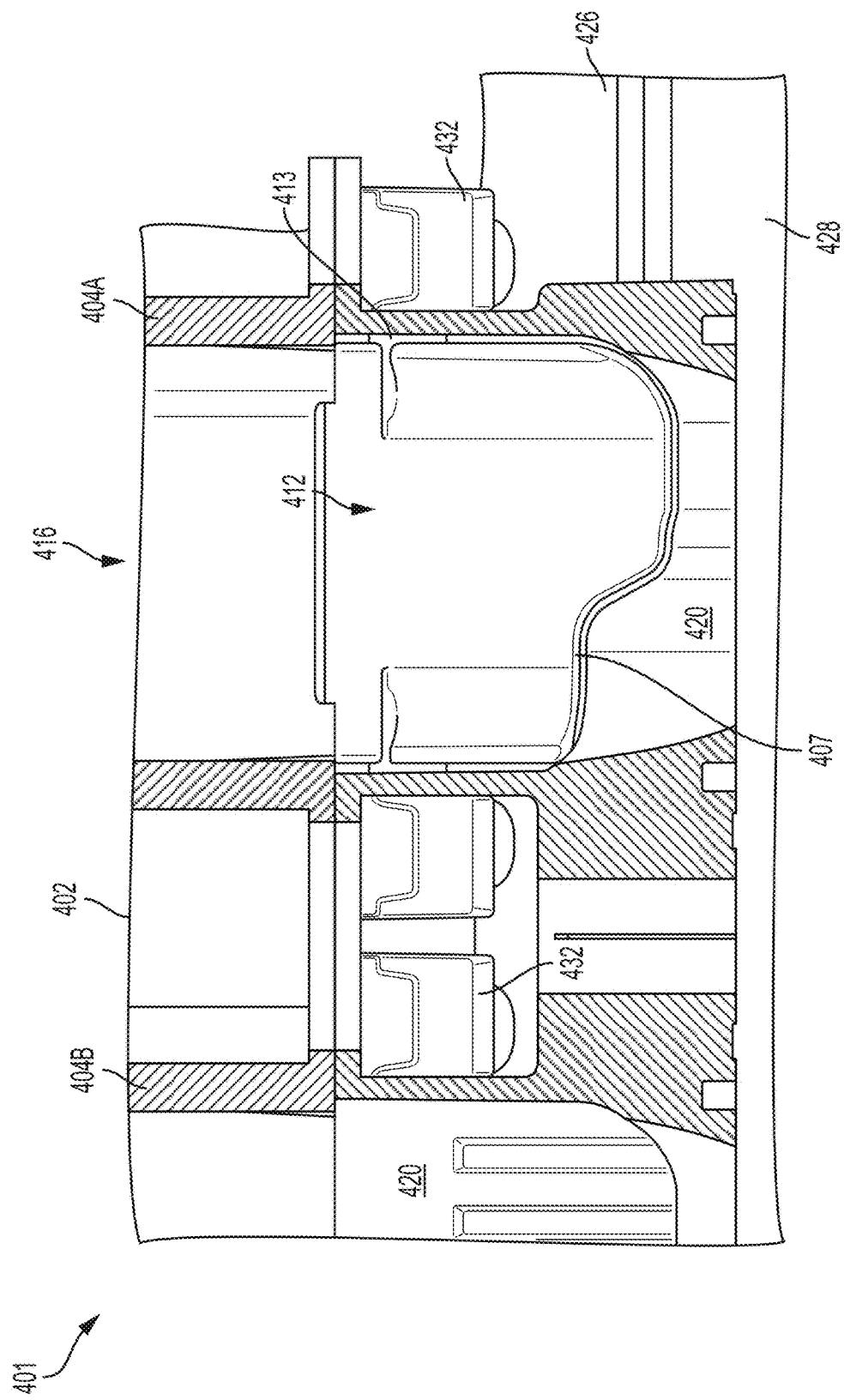
FIG. 4B shows an alternative view of the charge motion control valve adjusted to fully unblock the flow passage.
Figure 5A:
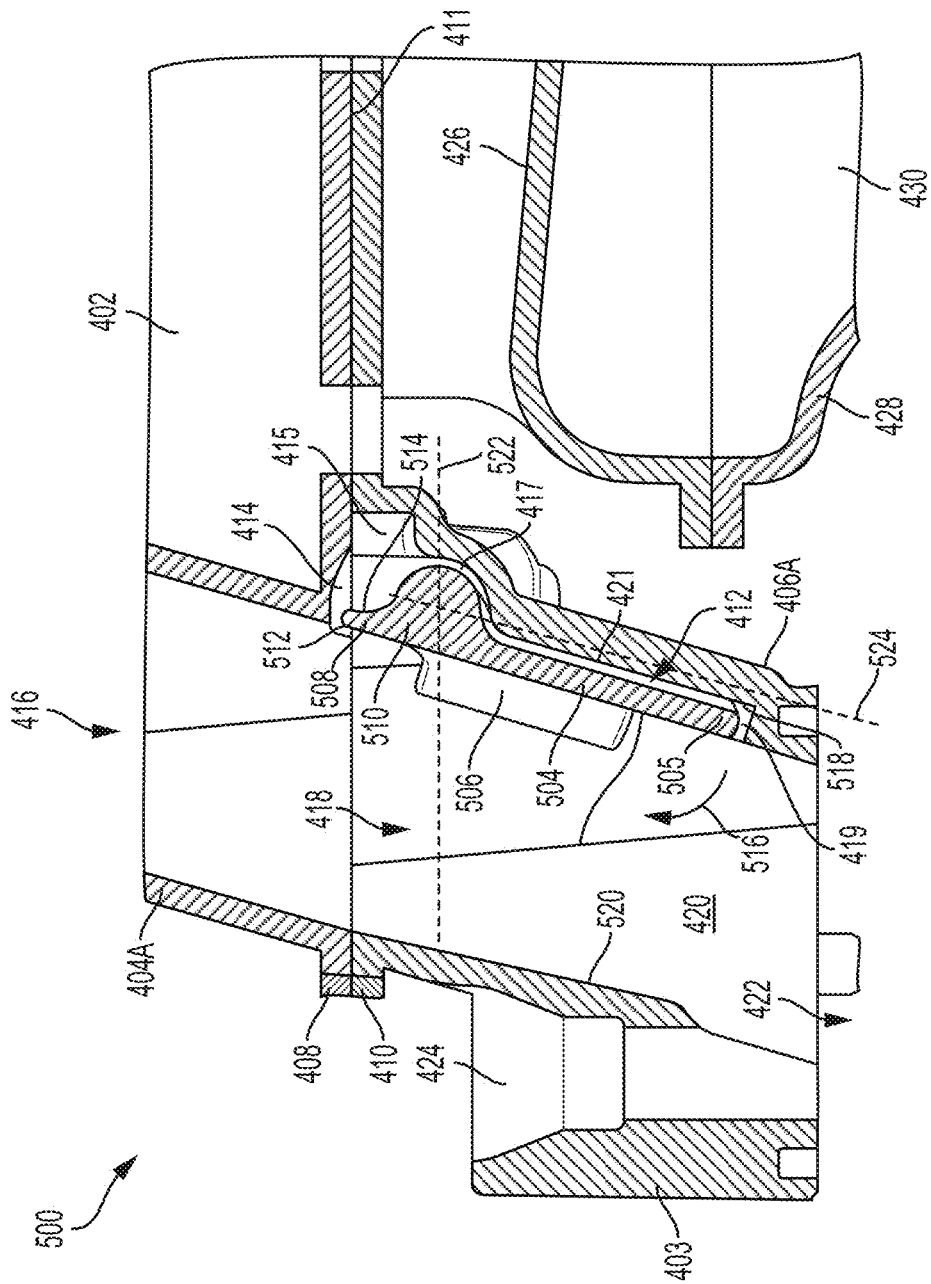
FIG. 5A shows a side view of the charge motion control valve adjusted to a fully unblocked position within the flow passage.

Referring to FIGS. 4A-4B, a schematic diagram showing an isometric view 400 and an alternative view 401, respectively of a charge motion control valve having a valve plate 412 adjusted to unblock a flow passage 418 is shown. The flow passage 418 may be formed within an intake manifold 402 and assembly 403. As an example, assembly 403 may be part of a cylinder head coupled to the intake manifold 402. In another example, assembly 403 may be a separate assembly sandwiched between the intake manifold 402 and the cylinder head. The intake manifold 402 may include a plurality of upstream ducts 404A-B. Assembly 403 may include a plurality of downstream ducts 406A-B, each downstream duct 406A-B aligned with each upstream duct 404A-B. At its upstream end, the intake manifold 402 may be coupled to an intake passage (such as passage 122 shown in FIG. 1) that directs air into the flow passage 418, as shown by arrow 416.

As shown in FIG. 4A, the intake manifold 402 is coupled to assembly 403 such that each upstream duct 404A-B aligns with each downstream duct 406A-B, forming flow passages that convey air to each combustion chamber of the engine. As an example, the intake manifold 402 and assembly 403 may be comprised of plastic or other suitable materials such as glass filled nylon and polypropylene. A top flange 408 of the intake manifold 402 may be coupled to a bottom flange 410 of assembly 403 forming a tight seal along contact interface 411 to minimize air leakage between the intake manifold 402 and assembly 403. In turn, assembly 403 may be coupled to the engine, thereby providing a continuous passage for air flow from the intake manifold 402 to each combustion chamber in the engine, as shown by arrow 422. A top portion 426 of assembly 403 may be coupled to a bottom portion 428, forming an opening 430, separate from the flow passage 418. The bottom portion 428 may form a portion of the cylinder head coupled to assembly 403, for example. Assembly 403 may include a plurality of recessed slots 424, formed adjacent to each downstream duct 406A-B. The flow passage 418 may include an internal wall 420, and a pocket comprising an upper recessed aperture 415, a curved channel 417 and a lower recessed aperture 419. As an example, the pocket may be adequately sized to receive the valve plate 412, when the valve plate is adjusted to fully unblock the flow passage 418. As an example, when the valve plate 412 is adjusted to fully unblock the flow passage 418, the valve plate may be in a fully unblocked position. The valve plate 412 may be comprised of a nylon material or steel. A recessed slot 414 with an arched surface may be formed adjacent to the pocket in the flow passage 418. As an example, the recessed slot 414 may be adequately sized to receive a rear portion of the valve plate 412, when the plate is adjusted to the fully unblocked position.

The valve plate 412 may be disposed in the flow passage 418 in such a manner that the valve plate rests in the pocket formed in the passage. The valve plate 412 may be coupled to a control shaft (such as control shaft 307 shown in FIG. 3) that may be actuated to adjust the valve plate to fully unblock the flow passage 418, with a portion of the valve plate resting in the pocket. The valve plate 412 may include a curved portion 407 and a spindle mechanism 413, as shown in FIG. 4B. The spindle mechanism 413 may couple to the control shaft, which may be mounted through recessed slots 432. Although not shown, the control shaft may be coupled to a valve actuator (such as actuator 210 shown in FIG. 3) that actuates the control shaft to adjust the position of the valve plate 412 within the flow passage 418 during engine operation.

When adjusted to the fully unblocked position, an inner face 421 of the valve plate 412 may be in face-sharing contact with an internal wall of the lower recessed aperture 419, as shown in FIG. 4A. In this example, the valve plate 412 is adjusted to a position that allows unobstructed air flow into the flow passage 418. In alternative examples, the valve plate 412 may be adjusted to partially block the flow passage 418 and restrict air flow entering flow passage inlet, as disclosed further below with reference to FIG. 5B. When adjusted to partially block the flow passage 418, a portion of the valve plate 412 may rest inside the recessed slot 414 and upper recessed aperture 415. In this way, the valve plate 412 may be adjusted to partially block the flow passage 418 to restrict air flow into the combustion chamber while minimizing air leakages at the periphery of the flow passage 418. By controlling air flow motion in the flow passage 418, turbulent flow conditions may be created in the combustion chamber to allow adequate mixing of air and injected fuel to produce a homogenous air-fuel mixture which combusts efficiently.

Figure 5B:
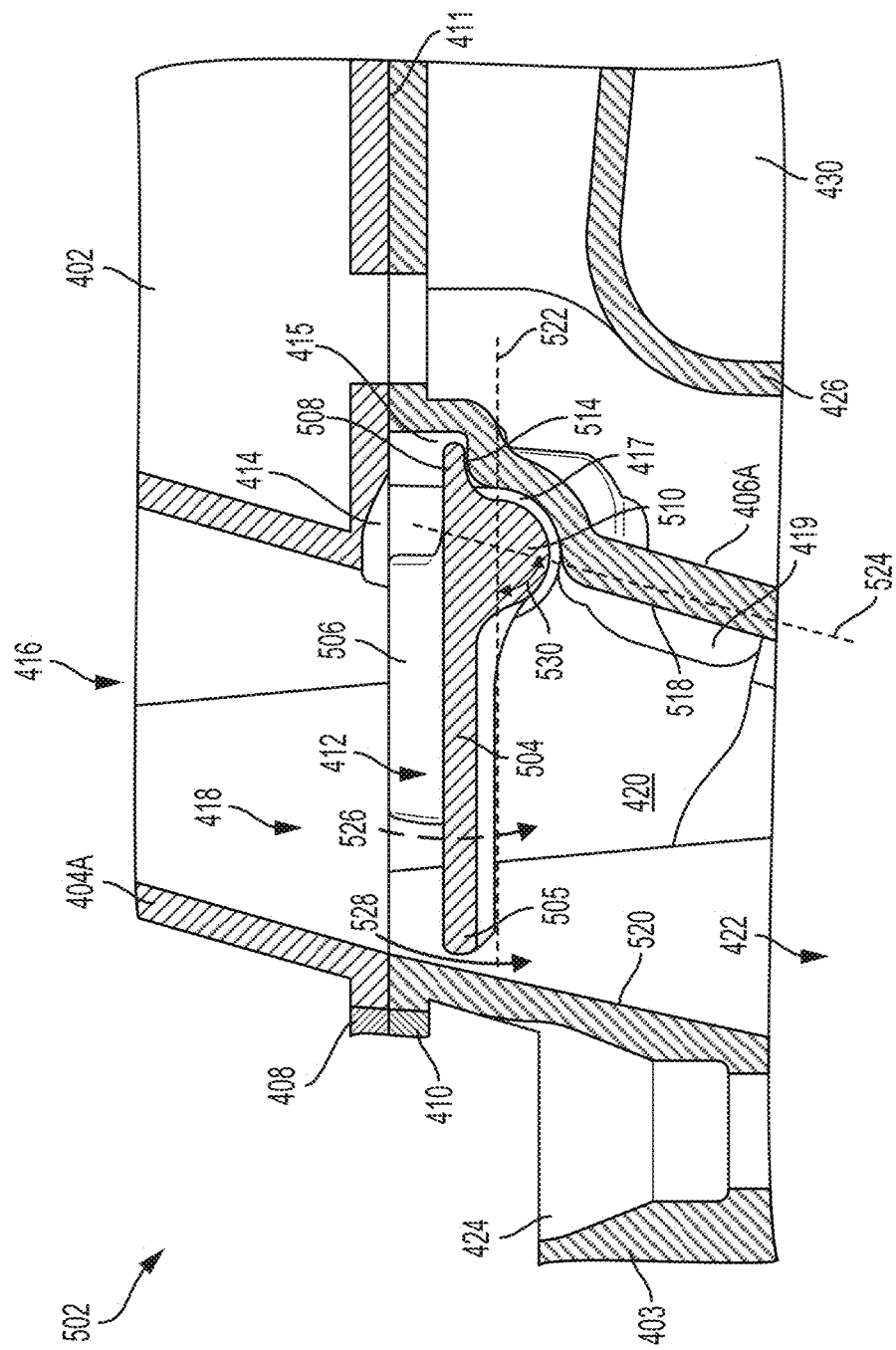
FIG. 5B shows a side view of the charge motion control valve adjusted to a fully blocked position within the flow passage.

Referring to FIGS. 5A-5B, a schematic diagram showing a first side view 500 and a second side view 502, respectively of the charge motion control valve positioned within the flow passage 418 is shown. In the first side view 500, the valve plate 412 is adjusted to fully unblock the flow passage 418. The second side view 502 shows the valve plate 412 adjusted to partially block the flow passage 418. The flow passage 418 is formed within the upstream duct 404A and downstream duct 406A. The upstream duct 404A may form a portion of the intake manifold 402, and the downstream duct 406A may form a portion of assembly 403. The flow passage 418 may be coupled to the combustion chamber, as shown by arrow 422.

When the valve plate 412 is adjusted to unblock the flow passage 418, the valve plate may rest in the pocket formed within the flow passage 418, as shown in FIG. 5A. The pocket may include the upper recessed aperture 415, curved channel 417 and lower recessed aperture 419. The pocket may be adequately sized to receive the valve plate 412, when the valve plate is adjusted to the fully unblocked position. A recessed slot 414 with an arched surface may be formed adjacent to the pocket in the flow passage 418. The recessed slot 414 may be adequately sized to receive a portion of the valve plate 412 when the plate is adjusted to fully unblock the flow passage 418. When resting inside the pocket, a front portion 505 of the valve plate 412 may rest in the lower recessed aperture 419, and the inner face 421 of the valve plate may be face-sharing contact with a first side 518 of the internal wall 420. As an example, the first side 518 of the flow passage may form a portion of an inner wall of the lower recessed aperture 419. An outer portion 506, formed adjacent to the inner portion 504 of the valve plate 412, may face a second side 520 of the internal wall 420. Further, a pivot 510 of the valve plate 412 may rest in the curved channel 417 that allows the valve plate to rotate about a fixed point. As an example, the front portion 505 of the valve plate 412 may have a rectangular shape, and the pivot 510 may have a semi-circular shape. When adjusted to the fully unblocked position, a back flap 508 of the valve plate 412 may face upstream and away from a recessed slot 414 in the passage. As an example, the recessed slot 414 may form a first sealing surface in the intake manifold to receive a rear surface 512 of the back flap 508 of the valve plate 412 when plate is fully opened; and the recessed aperture 415 may form a second sealing surface in a body to receive an opposite surface 514 of the back flap 508 of the plate when fully closed, wherein the body forms a portion of assembly 403. In this case, the valve plate 412 is fully open when the plate is adjusted to fully unblock the flow passage 418. Further, the valve plate 412 is fully closed when the plate is adjusted to partially unblock the flow passage 418.

When the valve plate 412 is adjusted to fully unblock the flow passage 418, the passage is unobstructed and may allow unrestricted air flow into the combustion chamber. In this example, air flow reaching the combustion chamber may be less turbulent, and air-fuel mixture in the chamber may be less homogenous. In alternative examples, the valve plate 412 may be adjusted to partially block the flow passage 418 by moving the front portion 505 of the valve plate 412 along direction arrow 516, while the pivot 510 rotates about a fixed point formed at an intersection between a first axis 522 and a second axis 524. By partially blocking the flow passage, air flow motion in the passage may be modified by redirecting the air flow in a particular segment of the intake valves within the combustion chamber to create turbulent flow which may enhance mixing of air and injected fuel in the combustion chamber. Details of the charge motion control valve with the valve plate adjusted to partially block the flow passage are disclosed further below with reference to FIG. 5B.

As shown in FIG. 5B, the charge motion control valve is adjusted to a fully blocked position, with the outer portion 506 of the valve plate 412 facing upstream of the passage, and the front portion 505 of the plate facing the second side 520 of the passage. When adjusted to the blocked position, the valve plate 412 may form a tilt angle 530 between the first axis 522 and second axis 524. As an example, the tilt angle 530 may range from 80 to 90 degrees. The advantages of using the charge motion control valve within the flow passage 418 may be reduced when the tilt angle 530 of the valve plate 412 is in a range of 0-80 degrees. When adjusted to the fully blocked position, the pivot 510 of the valve plate 412 may seat within the curved channel 417, and the back flap 508 of the plate may rest in the upper recessed aperture 415. As an example, the opposite surface 514 of the back flap 508 may be in face-sharing contact with a bottom wall of the upper recessed aperture 415. As an example, the back flap 508 may reduce air leakage or block air flow through a back portion of the valve plate 412. In this way, the valve plate 412 may be configured with the back flap 508 to reduce air leakage at the back portion of the valve plate while improving combustion efficiency of the air-fuel mixture in the combustion chamber.

When adjusted to the fully unblocked position, the valve plate 412 may block a portion of the flow passage 418 but still allow air flow into the combustion chamber via a primary aperture 526 and a secondary aperture 528 formed between the valve plate 412 and flow passage 418. By reducing the size of the flow passage 418, air flow velocities downstream of the valve plate 412 may increase, creating swirl flow which may enhance mixing of air and injected fuel to form a homogenous air-fuel mixture. In this way, the valve plate 412 may be adjusted to the fully blocked position to promote homogenization of the air-fuel mixture which may combust with improved efficiency while reducing air leakages around the control valve. Details of the side openings around the valve plate 412 and periphery of the flow passage 418 are disclosed further with reference to FIGS. 6A-6B.

Referring to FIGS. 6A-6B, a schematic diagram showing an isometric view 600 and a plan view 602, respectively of the charge motion control valve mounted within a flow passage 605 formed in the downstream duct 406A is disclosed. The valve plate 412 mounted within the flow passage 605, is shown in the fully unblocked position. The downstream duct 406A, formed within assembly 403, includes a flange 604 surrounding an inlet of the flow passage 605. Assembly 403 may also include planar portion 612, recessed slots 606 and a plurality of recessed slots 424 and 616 formed adjacent to the flange 604 of downstream ducts 406A-B. As an example, the assembly 403 may form an integral component of a cylinder head. In another example, assembly 403 may be a separate assembly sandwiched between the cylinder head and the intake manifold.

The recessed slots 606 may be adequately sized to receive a spindle 413 of the valve plate 412. The spindle 413 may be coupled to a control shaft (such as control shaft 307 shown in FIG. 3) that may be actuated to adjust a position of the valve plate 412. As an example, the control shaft may be coupled to a valve actuator (e.g., actuator 210 shown in FIG. 3) that may be actuated to adjust position of the valve plate 412 during engine operation. When positioned within the flow passage 605, the valve plate 412 may be in face-sharing contact with side walls of the passage along contact interfaces 608 and 610. The valve plate 412 may block a portion of the flow passage 605, creating a primary aperture 526 and a secondary aperture 528, which allow air flow into the downstream duct 406A. The valve plate 412 may restrict air leakage along contact interfaces 608 and 610 at the periphery of the flow passage 605. As an example, the primary aperture 526 may be larger than the secondary aperture 528, and may convey a higher air flow volume compared to an air flow volume conveyed via the second aperture. When the valve plate 412 is adjusted to the fully blocked position, the plate may block 80% of an inlet area of the flow passage, for example. By reducing the size of the passage inlet, air flow velocities in the flow passage 605 may increase, creating swirl flow in the combustion chamber positioned downstream of the valve plate 412. In this way, the valve plate 412 may be adjusted to the fully unblocked position, thereby speeding up air flow downstream of the valve plate to enhance mixing of air and injected fuel in the combustion chamber while minimizing air leakages at the periphery of the flow passage. The adequately mixed air and fuel in the combustion chamber may combust with improved efficiency while reducing fuel emissions.

Referring to FIGS. 7A-7B, a schematic diagram showing a first plan view 700 and a second plan view 702, respectively of an alternative embodiment of a charge motion control valve in a fully blocked position within a flow passage 706 is disclosed. In the first plan view 700, a valve plate 704 of the control valve is positioned within the flow passage 706 having a primary aperture 708, a secondary aperture 710 and side openings 712 at the periphery of the valve plate. The second plan view 702 shows the valve plate 704 positioned within the flow passage 706, with a shell membrane 716 placed in face-sharing contact with the valve plate and a flange 604 to reduce or minimize air leakage at the periphery of the flow passage 706.

As shown in FIG. 7A, the valve plate 704 is mounted within the flow passage 706 in the fully blocked position, with spindle 705 disposed in the recessed slot 606 formed within assembly 403. As an example, assembly 403 may be part of a cylinder head coupled to the intake manifold. In another example, assembly 403 may be a separate assembly sandwiched between the intake manifold and cylinder head. When adjusted to the fully unblocked position, the valve plate 704 may be in face-sharing contact with edges of the flow passage 706 along contact interface 608. The valve plate 704 may partially block the flow passage 706, however the primary aperture 708, formed between a curved section 707 of the valve plate and walls of the flow passage, may remain open to allow air flow into the passage. Also, the secondary aperture 710 formed between a front portion of the valve plate and wall of the flow passage 706, may remain open to allow restricted air flow into the passage. In this example, the valve plate 704 may not adequately block the side openings 712 and 714 around the periphery of the flow passage 706. As a result, air in the flow passage 706 may leak through the side openings 712 and 714, and may reduce combustion efficiency of the air-fuel mixture in the combustion chamber.

The shell membrane 716 may be in face-sharing contact with a portion of the valve plate 704 and flange 604 of the flow passage 706, as shown FIG. 7B. In this case, the shell membrane may block the side openings around the periphery of the valve plate 704. When placed in face contact with the valve plate 704 and flange 604, the shell membrane may block a portion of the side openings and may reduce air leakages along contact interfaces 718 and 720, formed adjacent to the side openings. Blocking gaps at the periphery of the valve plate and flow passage with the shell membrane provides additional benefits while minimizing failure modes associated with a plate gasket placed at the side and back portion of the valve plate. As an example, using the shell membrane 716 in conjunction with the valve plate 704 may minimize friction forces around the valve plate to improve response time during operation of the control valve. In addition, issues associated with use of the plate gasket, such as binding and degradation are reduced when the shell membrane is used to block gaps in the periphery of the valve plate and flow passage. Further, gasket wear which may expose the openings in the periphery of the flow passage may be reduced when the shell membrane is used instead of the plate gasket. By positioning the shell membrane 716 in face-sharing contact with the flange 604 of the flow passage 706, a size of the side openings 712 and 714 may be reduced, as disclosed further below with reference to FIG. 7C.

Turning to FIG. 7C, a schematic diagram of a charge motion control valve 703 having an assembly 722 placed in face-sharing contact with a portion of the valve plate 704 and the flange 604 of the flow passage 706 is shown. As shown in FIG. 7C, the assembly 722 may be coupled to assembly 403, and flange 604 may be in face-sharing contact with a bottom portion of assembly 722 along contact interface 724. As an example, assembly 722 may form a portion of an intake manifold coupled to assembly 403, with a shell membrane (such as membrane 716 shown in FIG. 7B) sandwiched between an interface surface of the manifold and the cylinder head at the flow passage. Assembly 403 may form a portion of the cylinder head coupled to the intake manifold, for example. The shell membrane may seal tightly against the flange 604, and may block the side openings 712 and 714 formed at the periphery of the flow passage 706, for example. Air flow from an intake passage (such as passage 122 shown in FIG. 1) may enter the flow passage 706, as shown by arrow 416. The valve plate 704 may be rotatably mounted in the flow passage 706 to control air flow directed into the combustion chamber placed downstream of the valve plate, as shown by arrow 422. As an example, the valve plate may be rotatably mounted in the flow passage 706, with an interface surface of the manifold that is in face-sharing contact with the cylinder head at the passage inlet in a position that may be inwardly offset around a perimeter of the flow passage. In this way, the intake manifold may be coupled to the cylinder head at the passage inlet to minimize air leakages through the side openings 712 and 714 at the periphery of the flow passage 706. By minimizing air leakages, air flow in the flow passage 706 may be adequately flowed to the combustion chamber, where the air is adequately mixed with injected fuel and ignited to provide thermal energy for piston movement.

Returning to FIG. 7B, the primary and secondary apertures may remain open to allow air flow into the flow passage 706. The air entering the flow passage 706 may increase in velocity due to the reduced size of the flow passage 706. The increased air flow velocities inside the flow passage 706 may create swirl motion or turbulent flow in the combustion chamber placed downstream of the valve plate 704. The swirl motion in the combustion chamber may enhance mixing of air and fuel to homogenize the air-fuel mixture which may combust with improved efficiency. In this way, the valve plate 704, may be adjusted to the fully blocked position, with the shell membrane 716 positioned adjacent to the valve plate to reduce air leakages at the periphery of the flow passage 706. By reducing air leakages at the periphery of the flow passage 706, the air-fuel mixture in the combustion chamber may combust with improved efficiency while reducing fuel emissions.

In one example, a system may comprise: a valve plate with a pivot axis mounted in a body coupled to a manifold runner, the plate having a rear portion overhanging the pivot; and a first sealing surface in the manifold runner to receive a surface of the rear portion of the valve plate when fully opened; and a second sealing surface in the body to receive an opposite surface of the rear portion of the valve plate when fully closed. In the preceding example, additionally or optionally, the body includes a pocket comprising an upper recessed aperture, a curved channel and a lower recessed aperture, and the manifold runner has a recessed slot with an arched surface formed at a downstream portion of the runner. In any or all of the preceding examples, additionally or optionally, the body forms an integral component of a cylinder head. In any or all of the alternate examples, additionally or optionally, the body is a separate assembly sandwiched between a cylinder head and an intake manifold. In any or all of the preceding examples, additionally or optionally, the intake manifold is comprised of plastic material.

In any or all of the preceding examples, additionally or optionally, the front portion of the valve plate has a rectangular shape; the pivot has a semi-circular shape, and the rear portion of the valve plate has an extended horizontal arm; wherein the valve plate rests in a pocket formed in the body; wherein the pocket includes a lower slot, a curved channel and an upper slot having a curved bottom wall. In any or all of the preceding examples, additionally or optionally, wherein when the valve plate on the side of the pivot opposite the rear valve plate portion rests in the lower slot, with an inner face of the valve plate aligning with an internal wall of the lower slot; and the pivot rests in the curved channel. In any or all of the preceding examples, additionally or optionally, when the valve plate is in a fully blocked position, the front portion of the valve plate faces a first side of a flow passage in the body; the pivot rests in the curved channel; and the rear portion rests in the upper slot. In any or all of the preceding examples, additionally or optionally, the first side of the flow passage is opposite to a second of the passage.

Another example system comprises: a cylinder head with a cylinder port; an intake manifold with a runner; a charge motion control valve rotatably mounted in the cylinder port, wherein an interface surface of the manifold that is in face-sharing contact with the cylinder head at the port is inwardly offset around a perimeter. In any or all of the preceding examples, additionally or optionally, the charge motion control valve includes a valve plate having a rear overhang opposite a major portion of the valve plate relative to a pivot, the overhang sealing against a wall of the cylinder port downstream of the valve plate. In any or all of the preceding examples, additionally or optionally, the interface surface is mounted upstream of the cylinder head to form a tight seal between the intake manifold and the cylinder port. In any or all of the preceding examples, additionally or optionally, the interface surface is mounted to the cylinder head to block secondary openings around a perimeter of the cylinder port.

An alternative example system comprises: a cylinder head with a cylinder port; an intake manifold with a runner; an assembly with a charge motion control valve rotatably mounted therein and a passage aligning with the head port and manifold runner, wherein an interface surface of the manifold that is in face-sharing contact with the assembly at the passage is inwardly offset around a perimeter. In the preceding example, additionally or optionally, the assembly is separate from the cylinder head and sandwiched between the cylinder head and the intake manifold. In any or all of the preceding examples, additionally or optionally, the interface surface of the manifold is coupled to the assembly to block secondary openings around a perimeter of the head port. In any or all of the preceding examples, additionally or optionally, the manifold is coupled to the assembly forming a tight seal between the manifold and the assembly at the passage. In any or all of the preceding examples, additionally or optionally, when the charge motion control valve is in a fully blocked position, a primary opening formed between a curved section of the control valve and walls of the head port, is smaller than a passage inlet in the head port. In any or all of the preceding examples, additionally or optionally, the charge motion control valve includes a valve plate having a rear overhang opposite a major portion of the valve plate relative to a pivot, the overhang sealing against a wall of the cylinder port downstream of the valve plate.

FIGS. 2-7C show example configurations with relative positioning of the various components of the charge motion control valve. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a valve plate with a pivot axis mounted in a body coupled to a manifold runner, the plate having a rear portion overhanging the pivot; and
a first sealing surface in the manifold runner to receive a surface of the rear portion of the valve plate when fully opened; and
a second sealing surface in the body to receive an opposite surface of the rear portion of the valve plate when fully closed.

2. The system of claim 1, wherein the body includes a pocket comprising an upper recessed aperture, a curved channel and a lower recessed aperture; and wherein the manifold runner includes a recessed slot with an arched surface formed at a downstream portion of the runner.

3. The system of claim 1, wherein the body forms an integral component of a cylinder head.

4. The system of claim 1, wherein the body is a separate assembly sandwiched between a cylinder head and an intake manifold.

5. The system of claim 1, wherein the intake manifold is comprised of plastic material.

6. The system of claim 1, wherein a front portion of the valve plate has a rectangular shape, the pivot has a semi-circular shape, and the rear portion of the valve plate has an extended horizontal arm; wherein the valve plate rests in a pocket formed in the body; and wherein the pocket includes a lower slot, a curved channel and an upper slot having a curved bottom wall.

7. The system of claim 6, wherein when the valve plate is in a fully blocked position, the front portion of the valve plate on the side of the pivot opposite the rear valve plate portion rests in the lower slot, with an inner face of the valve plate aligning with an internal wall of the lower slot; and the pivot rests in the curved channel.

8. The system of claim 6, wherein when the valve plate is in a fully blocked position, the front portion of the valve plate faces a first side of a flow passage in the body; the pivot rests in the curved channel; and the rear portion rests in the upper slot.

9. The system of claim 8, wherein the first side of the flow passage is opposite to a second of the passage.

10. A system, comprising:
a cylinder head with a cylinder port;
an intake manifold with a runner;
a charge motion control valve rotatably mounted in the cylinder port, wherein an interface surface of the manifold that is in face-sharing contact with the cylinder head at the port is inwardly offset around a perimeter.

11. The system of claim 10, wherein the charge motion control valve includes a valve plate having a rear overhang opposite a major portion of the valve plate relative to a pivot, the overhang sealing against a wall of the cylinder port downstream of the valve plate.

12. The system of claim 10, wherein the interface surface is mounted upstream of the cylinder head to form a tight seal between the intake manifold and the cylinder port.

13. The system of claim 10, wherein the interface surface is mounted to the cylinder head to block secondary openings around a perimeter of the cylinder port.

14. The system of claim 10, wherein the charge motion control valve is coupled to a control shaft connected to a valve actuator mechanism.

15. A system, comprising:
a cylinder head with a cylinder port;
an intake manifold with a runner;
an assembly with a charge motion control valve rotatably mounted therein and a passage aligning with the head port and manifold runner, wherein an interface surface of the manifold that is in face-sharing contact with the assembly at the passage is inwardly offset around a perimeter.

16. The system of claim 15, wherein the assembly is separate from the cylinder head and sandwiched between the cylinder head and the intake manifold.

17. The system of claim 15, wherein the interface surface of the manifold is coupled to the assembly to block secondary openings around a perimeter of the head port.

18. The system of claim 15, wherein the manifold is coupled to the assembly forming a tight seal between the manifold and the assembly at the passage.

19. The system of claim 15, wherein when the charge motion control valve is in a fully blocked position, a primary opening formed between a curved section of the control valve and walls of the head port, is smaller than a main inlet in the head port.

20. The system of claim 15, wherein the charge motion control valve includes a valve plate having a rear overhang opposite a major portion of the valve plate relative to a pivot, the overhang sealing against a wall of the cylinder port downstream of the valve plate.

\* \* \* \* \*